United States Patent
Nagahara et al.

(10) Patent No.: US 9,733,362 B2
(45) Date of Patent: Aug. 15, 2017

(54) SATELLITE SIGNAL RECEIVER

(71) Applicant: Seiko Epson Corporation, Tokyo (JP)

(72) Inventors: Mikio Nagahara, Yamagata (JP); Hiroshi Uozumi, Matsumoto (JP); Naoki Gobara, Shiojiri (JP); Ryota Hirakawa, Shiojiri (JP)

(73) Assignee: Seiko Epson Corporation (JP)

( * ) Notice: Subject to any disclaimer, the term of this patent is extended or adjusted under 35 U.S.C. 154(b) by 450 days.

(21) Appl. No.: 14/532,453

(22) Filed: Nov. 4, 2014

(65) Prior Publication Data

US 2015/0123848 A1 May 7, 2015

(30) Foreign Application Priority Data

Nov. 5, 2013 (JP) .................. 2013-229056

(51) Int. Cl.
*G01S 19/34* (2010.01)

(52) U.S. Cl.
CPC .................. *G01S 19/34* (2013.01)

(58) Field of Classification Search
CPC .................. G01S 19/34; G01S 19/26
USPC ....................... 342/357.74, 357.65
See application file for complete search history.

(56) References Cited

U.S. PATENT DOCUMENTS

| | | | |
|---|---|---|---|
| 3,701,894 A | 10/1972 | Low et al. | |
| 5,650,785 A | 7/1997 | Rodal | |
| 5,898,665 A | 4/1999 | Sawahashi et al. | |
| 5,949,812 A | 9/1999 | Turney et al. | |
| 6,154,487 A | 11/2000 | Murai et al. | |
| 6,377,683 B1 | 4/2002 | Dobson et al. | |
| 6,888,879 B1 | 5/2005 | Lennen | |
| 7,110,442 B2 | 9/2006 | Lennen | |
| 7,157,794 B2 | 1/2007 | Mori | |
| 7,545,036 B2 | 6/2009 | Terui et al. | |
| 8,634,504 B2 | 1/2014 | Terashima et al. | |
| 8,737,363 B2 | 5/2014 | Ozluturk et al. | |
| 8,755,472 B2 | 6/2014 | Sun et al. | |
| 2002/0150150 A1 | 10/2002 | Kohli et al. | |
| 2003/0081660 A1 | 5/2003 | King et al. | |
| 2003/0127704 A1 | 7/2003 | Kobayashi et al. | |
| 2003/0189251 A1 | 10/2003 | Terui et al. | |
| 2003/0205808 A1 | 11/2003 | Terui et al. | |
| 2004/0202235 A1 | 10/2004 | Kohli et al. | |

(Continued)

FOREIGN PATENT DOCUMENTS

| | | |
|---|---|---|
| JP | 2013-142607 A | 12/1976 |
| JP | 2001-042023 A | 2/2001 |

(Continued)

OTHER PUBLICATIONS

World's Smallest and Thinnest 0.15 X 0.15 mm, 7.5 micro meter thick RFID IC chip. Hitachi, Ltd., Feb. 2006.

(Continued)

*Primary Examiner* — Harry Liu
(74) *Attorney, Agent, or Firm* — Harness, Dickey & Pierce, P.L.C.

(57) ABSTRACT

A satellite signal receiver has a positioning error in a range from −8 m to +8 m with a probability equal to or more than 95% when positioning in a reception environment with a signal strength equal to or more than −135 dBm and average power consumption from start of positioning to first positioning equal to or less than 7 mW.

4 Claims, 10 Drawing Sheets

(56) References Cited

U.S. PATENT DOCUMENTS

| | | |
|---|---|---|
| 2006/0056497 A1 | 3/2006 | Lennen |
| 2006/0215740 A1 | 9/2006 | Teruuchi et al. |
| 2008/0001287 A1 | 1/2008 | Nakashiba |
| 2008/0101442 A1 | 5/2008 | Rasmussen |
| 2008/0151970 A1 | 6/2008 | Chen et al. |
| 2009/0066575 A1 | 3/2009 | Tsutsui |
| 2009/0168843 A1 | 7/2009 | Waters et al. |
| 2009/0168853 A1 | 7/2009 | Gobara |
| 2009/0259707 A1 | 10/2009 | Martin et al. |
| 2009/0278738 A1 | 11/2009 | Gopinath |
| 2009/0309792 A1 | 12/2009 | Hanabusa |
| 2010/0039316 A1 | 2/2010 | Gronemeyer et al. |
| 2010/0040117 A1 | 2/2010 | Lawrow |
| 2010/0254492 A1 | 10/2010 | Chen |
| 2011/0237277 A1 | 9/2011 | Terashima et al. |
| 2011/0254732 A1 | 10/2011 | Martin et al. |
| 2012/0202428 A1 | 8/2012 | Mirbaha et al. |
| 2013/0084845 A1 | 4/2013 | Kimura et al. |
| 2013/0177045 A1 | 7/2013 | Terashima |
| 2013/0177046 A1 | 7/2013 | Terashima |
| 2013/0285854 A1 | 10/2013 | Gobara |
| 2014/0071928 A1 | 3/2014 | Papasakellariou et al. |
| 2014/0092764 A1 | 4/2014 | Ogawa |
| 2014/0098788 A1 | 4/2014 | Uemura et al. |
| 2014/0119308 A1 | 5/2014 | Mochida |
| 2014/0333477 A1* | 11/2014 | Lennen .................. G01S 19/34 342/357.65 |
| 2015/0206837 A1 | 7/2015 | Gu et al. |
| 2015/0289206 A1 | 10/2015 | Kimura et al. |
| 2015/0301192 A1* | 10/2015 | Leclercq ................ G01S 19/24 342/357.31 |
| 2016/0026157 A1* | 1/2016 | Baba ...................... G01S 19/33 368/47 |

FOREIGN PATENT DOCUMENTS

| | | |
|---|---|---|
| JP | 2001-159670 A | 6/2001 |
| JP | 2002-530974 A | 9/2002 |
| JP | 2003-504919 A | 2/2003 |
| JP | 2004-179255 A | 6/2004 |
| JP | 2004-260217 A | 9/2004 |
| JP | 2006-270510 A | 10/2006 |
| JP | 2009-063451 A | 3/2009 |
| JP | 2009-175123 A | 8/2009 |
| JP | 2009-266964 A | 11/2009 |
| JP | 2009-276198 A | 11/2009 |
| JP | 2011-520131 A | 7/2011 |
| JP | 2011-220998 A | 11/2011 |
| JP | 2012-010202 A | 1/2012 |
| JP | 2013-142606 A | 7/2013 |
| JP | 2013-228250 A | 11/2013 |
| JP | 2013-229056 A | 11/2013 |
| JP | 2013-235404 A | 11/2013 |
| WO | WO-00-31659 A1 | 6/2000 |
| WO | WO-01-03294 A1 | 1/2001 |

OTHER PUBLICATIONS

Datasheet for CXD2951GA-4 Single Chip GPS LSI, Sony Corporation.

Jae-Chern Yoo et al., "1-D Fast Normalized Cross-Correlation Using Additions", Digital Signal Processing, Academic Press, Orlando, FL, US, vol. 20, No. 5, Sep. 1, 2010, pp. 1482-1493, XP027070377.

* cited by examiner

[INTERMITTENT DRIVE SWITCHING SETTING TABLE] 220

| RECEIVED SIGNAL STRENGTH | DUTY RATIO |
|---|---|
| ~P1 | 100% |
| P1~P2 | 80% |
| P2~P3 | 64% |
| P3~P4 | 56% |
| P4~P5 | 40% |
| P5~P6 | 20% |
| P6~ | 12% |

[INTERMITTENT DRIVE PATTERN SETTING TABLE] 230

INTERMITTENT DRIVE PATTERN 232

| DUTY RATIO | UP-PERIOD 1 | UP-PERIOD 2 | UP-PERIOD 3 | UP-PERIOD 4 |
|---|---|---|---|---|
| 80% | 100ms~900ms | — | — | — |
| 64% | 40ms~200ms | 300ms~460ms | 540ms~700ms | 800ms~960ms |
| 56% | 60ms~200ms | 300ms~440ms | 560ms~700ms | 800ms~940ms |
| 40% | 80ms~180ms | 320ms~420ms | 580ms~680ms | 820ms~920ms |
| 20% | 400ms~600ms | — | — | — |
| 12% | 440ms~560ms | — | — | — |

| | | \multicolumn{7}{c}{SIGNAL STRENGTH [dBm]} |
|---|---|---|---|---|---|---|---|---|
| | | −130 | −135 | −140 | −142 | −143 | −144 | −145 |
| DUTY RATIO | 100% | 84.98 | 85.1 | 85.57 | 95.35 | 100 | 99.94 | 100 |
| | 80% | 0 | 0 | 1.58 | 2.89 | 0 | 0 | 0 |
| | 64% | 0 | 0 | 1.79 | 1.13 | 0 | 0 | 0 |
| | 56% | 0 | 0 | 5.63 | 0 | 0 | 0 | 0 |
| | 40% | 0 | 0 | 2.61 | 0.63 | 0 | 0.06 | 0 |
| | 20% | 0 | 3.99 | 0.82 | 0 | 0 | 0 | 0 |
| | 12% | 15.02 | 10.91 | 0 | 0 | 0 | 0 | 0 |

SATELLITE SIGNAL RECEIVER

CROSS-REFERENCE

This application claims priority to Japanese Patent Application No. 2013-229056, filed Nov. 5, 2013 the entirety of which is hereby incorporated by reference. The entire disclosures of Japanese Patent Application No. 2012-002803, filed Jan. 11, 2012, Japanese Patent Application No. 2012-002804, filed Jan. 11, 2012, Japanese Patent Application No. 2010-274804, filed Dec. 9, 2010, and Japanese Patent Application No. 2012-099755, filed Apr. 25, 2012 are also hereby expressly incorporated by reference herein.

BACKGROUND

1. Technical Field

The present invention relates to a satellite signal receiver.

2. Related Art

Portable apparatuses having positioning receivers such as GPS (Global Positioning System) receivers have been widely used. Specifications desired for portable apparatuses include driving for longer hours and downsizing. However, power consumption and battery weight/volume have a trade-off relationship. Accordingly, a power consumption that is as low as possible is desired for various electronic circuits in such portable apparatuses. The same applies to positioning receivers and, for example, a technology of intermittently performing circuit operations to suppress power consumption is disclosed in JP-A-2009-276198.

However, there are no limits to the demand for power consumption reduction. Accordingly, receivers capable of positioning with higher accuracy and lower power consumption than conventional receivers are desired.

SUMMARY

A first aspect of the invention is directed to a satellite signal receiver having a positioning error in a range from −8 m to +8 m with a probability equal to or more than 95% in the case of positioning in a reception environment with a signal strength equal to or more than −135 dBm and average power consumption from start of positioning to first positioning equal to or less than 7 mW.

A second aspect of the invention is directed to a satellite signal receiver having a positioning error in a range from −8 m to +8 m with a probability equal to or more than 95% in the case of positioning in a reception environment with a signal strength equal to or more than −135 dBm and average power consumption from start of positioning to 60 seconds equal to or less than 6 mW.

A third aspect of the invention is directed to a satellite signal receiver having a positioning error in a range from −8 m to +8 m with a probability equal to or more than 95% in the case of positioning in a reception environment with a signal strength equal to or more than −135 dBm and average power consumption from start of positioning to after first positioning equal to or less than 5 mW.

A fourth aspect of the invention is directed to the satellite signal receiver, wherein the average power consumption after the first positioning is equal to or less than 4 mW.

According to the first to fourth aspects of the invention, a satellite signal receiver with higher positioning accuracy and lower power consumption than that in the related art may be realized.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Below, embodiments of the invention will be explained with reference to the drawings. Obviously, the embodiments to which the invention is applicable are not limited to those described.

Overall Configuration

Figure 1:
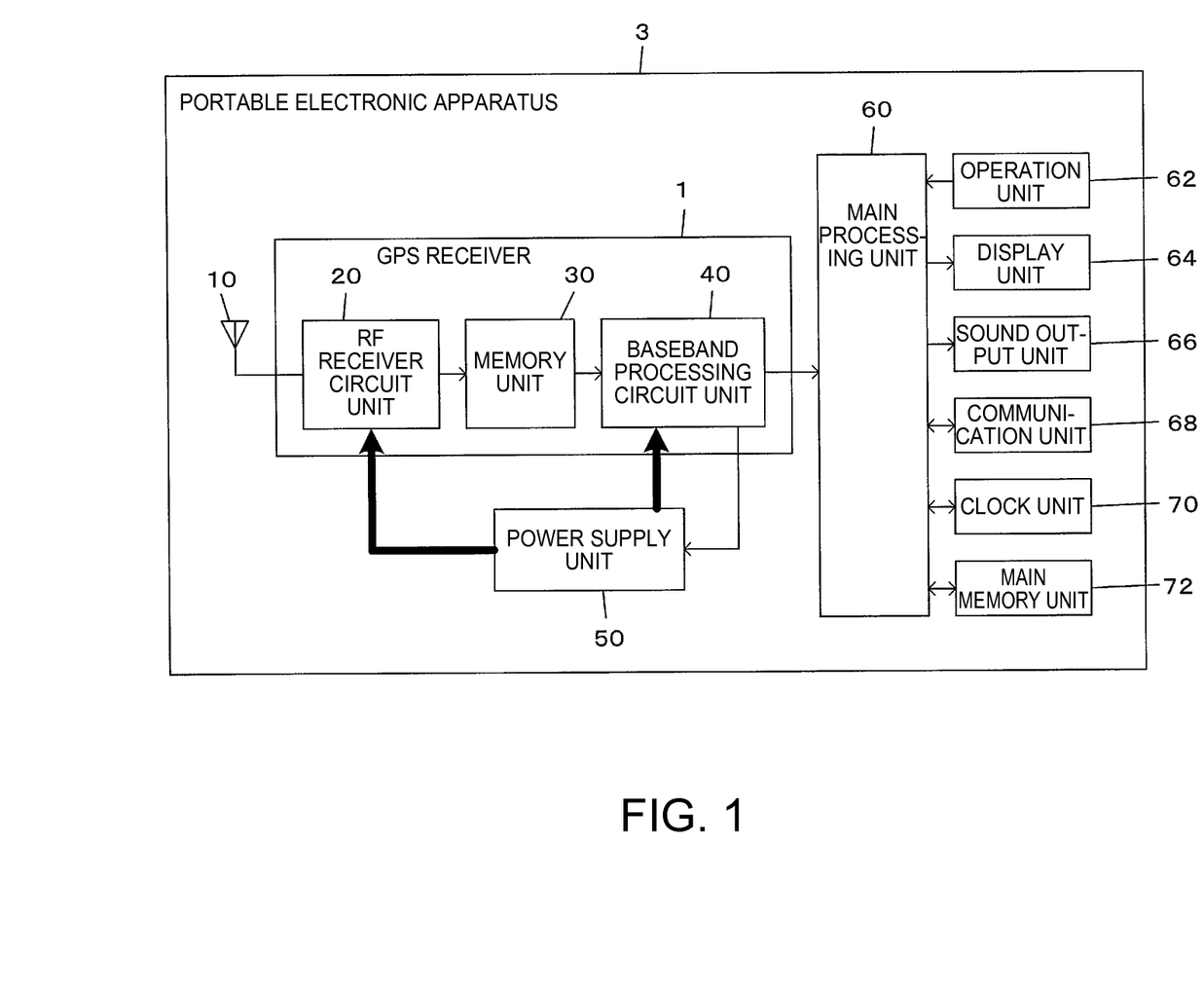
FIG. 1 is a configuration diagram of a portable electronic apparatus.

FIG. 1 is a configuration diagram of a portable electronic apparatus 3 in the embodiment. The portable electronic apparatus 3 is a small electronic apparatus carried and used by a user, and embodied by a wrist-watch type wearable computer called a runner's watch or the like, for example. As shown in FIG. 1, the portable electronic apparatus 3 includes a GPS antenna 10, a GPS receiver 1, a power supply unit 50, a main processing unit 60, an operation unit 62, a display unit 64, a sound output unit 66, a communication unit 68, a clock unit 70, and main memory unit 72.

The GPS antenna 10 receives RF (Radio Frequency) signals containing GPS satellite signals transmitted from GPS satellites. The GPS satellite signals are spectrum-modulated using C/A (Coarse/Acquisition) codes as a spread code, and superimposed on a carrier wave at 1.57542 GHz.

The GPS receiver 1 is a satellite signal receiver that receives GPS satellite signals (positioning satellite signals) transmitted from GPS satellites (positioning satellites) and calculates a position or other parameters of the GPS receiver 1 based on navigation messages including orbital information (ephemerides and almanacs) of the GPS satellites superimposed and carried on the received GPS satellite signals. As shown in FIG. 1, the GPS receiver 1 includes an RF receiver circuit unit 20, a memory unit 30, and a baseband processing circuit unit 40.

The RF receiver circuit unit 20 down-converts the RF signals received by the GPS antenna 10 into intermediate frequency signals (IF signals), amplifies them, and then converts the signals into digital signals and outputs them.

The memory unit 30 stores data of received signals received by the RF receiver circuit unit 20.

The baseband processing circuit unit 40 captures and tracks the GPS satellite signals using the data of the received signals stored in the memory unit 30, and calculates the position and the clock error of the GPS receiver 1 using time information, satellite orbital information, and the like extracted from the captured GPS satellite signals.

The power supply unit 50 supplies power to the respective units of the GPS receiver 1 (RF receiver circuit unit 20, memory unit 30, and baseband processing circuit unit 40) according to power supply control signals by the baseband processing circuit unit 40.

The main processing unit 60 performs integrated control on the respective units of the portable electronic apparatus 3 according to various programs including a system program stored in the main memory unit 72.

The operation unit 62 is an input device such as a touch panel, a button switch, or the like, and outputs operation signals in response to a user's operation to the main processing unit 60. The display unit 64 is a display device including an LCD and displays various images based on display signals from the main processing unit 60. The sound output unit 66 is a sound output device such as a speaker and outputs various sounds based on sound signals from the main processing unit 60.

The communication unit 68 is, for example, a communication device for a wireless LAN (Local Area Network) and Bluetooth (registered trademark) and performs communication with an external apparatus. The clock unit 70 is an internal clock and includes an oscillator circuit having a crystal oscillator or the like, and measures a current time, a lapse time from a designated time, and the like.

The main memory unit 72 is a memory device including a ROM, a RAM, or the like, stores the system program for integrated control of the respective units of the portable electronic apparatus 3 by the main processing unit 60 and programs and data for realization of various functions of the portable electronic apparatus 3 and is used as a work area of the main processing unit 60, and temporarily stores the calculation results of the main processing unit 60, operation data from the operation unit 62, and the like.

Principle

Figure 2:
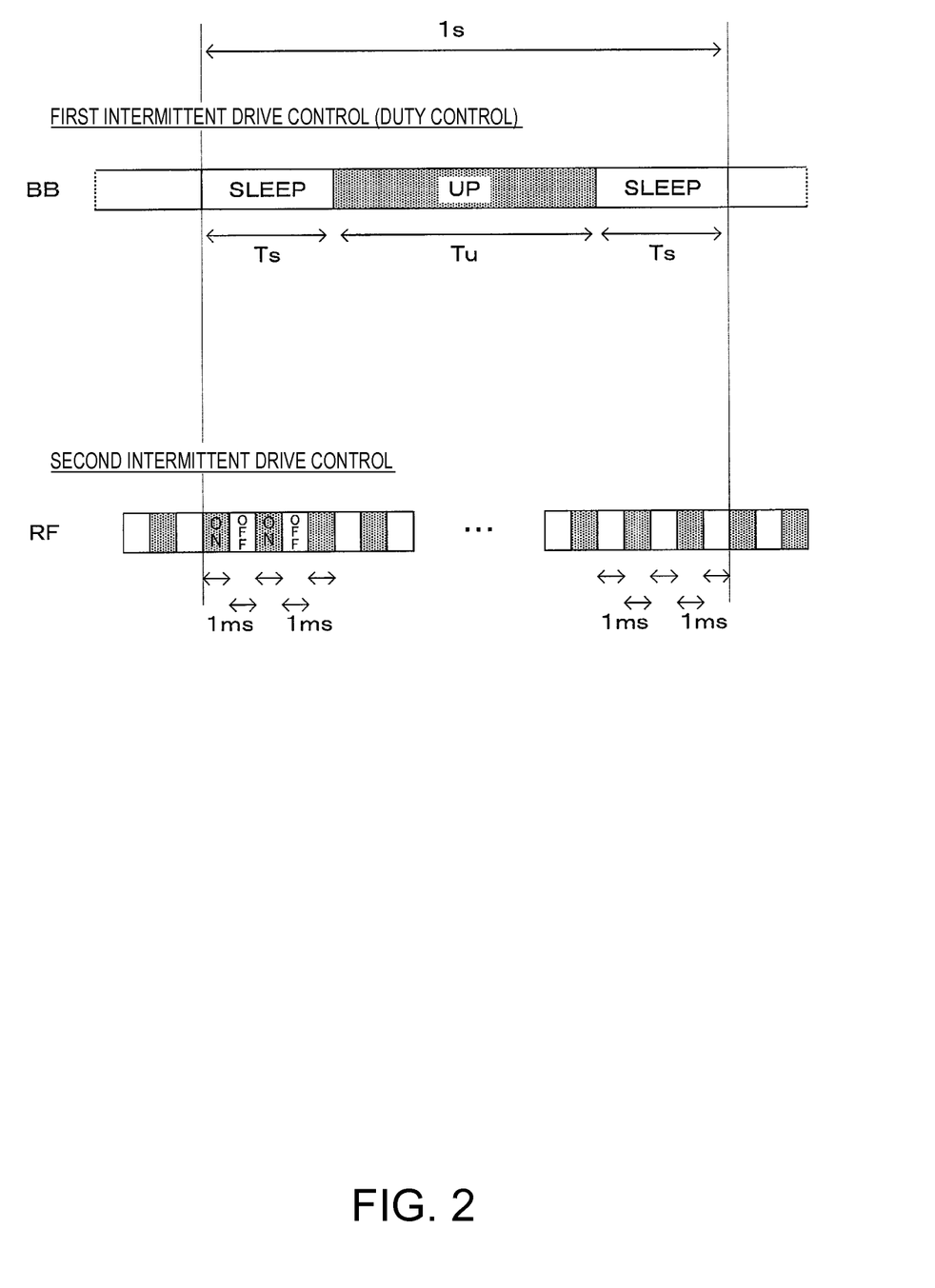
FIG. 2 is a schematic explanation diagram of intermittent drive.
Figure 3A:
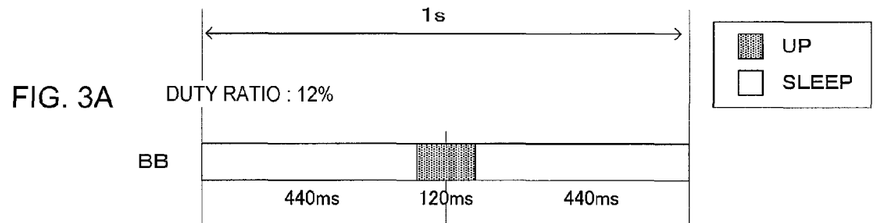
FIGS. 3A to 3F are explanatory diagrams of changes of a duty ratio.
Figure 3B:
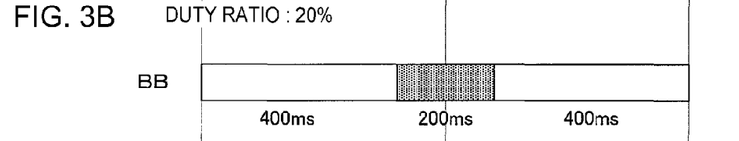
Figure 3C:
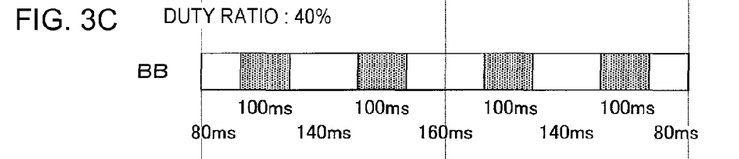
Figure 3D:
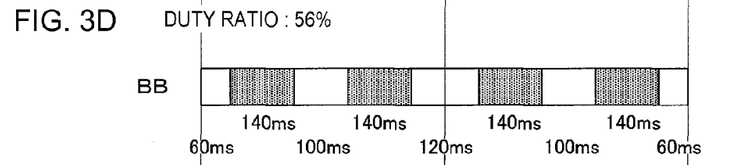
Figure 3E:
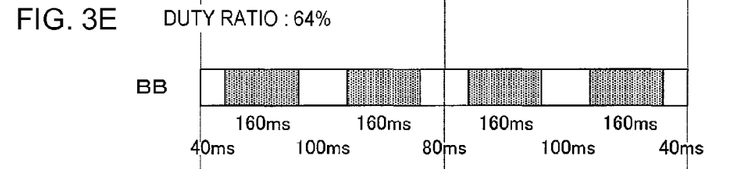
Figure 3F:
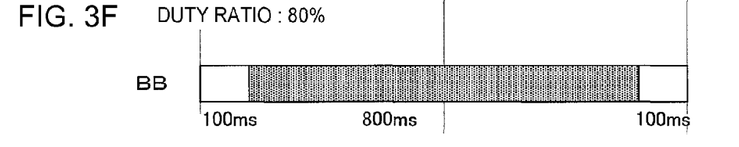

The GPS receiver 1 of the embodiment realizes power savings by respectively intermittently driving the RF receiver circuit unit 20 and the baseband processing circuit unit 40. FIG. 2 shows an outline of the intermittent driving in the GPS receiver 1. An operation state of the baseband processing circuit unit 40 is shown in the upper part of FIG. 2 and an operation state of the RF receiver circuit unit 20 is shown in the lower part of FIG. 2.

With respect to the baseband processing circuit unit 40, the so-called duty control (first intermittent drive control) of repeating a period in which the operation state is an UP-state (UP-period; Tu) and a period in which the operation state is a SLEEP-state (SLEEP-period; Ts) at predetermined cycles with an operation period of position calculation (e.g., one second) as a unit period is performed. The UP-state is an operation state in which capturing processing and position calculation processing of GPS satellite signals and processing relating to the intermittent drive control are performed. On the other hand, the SLEEP-state is an operation state in which the capturing processing and the position calculation are not performed (the operation is paused), but processing relating to the intermittent drive control is performed. In the SLEEP-state, the operation clock may be reduced compared to that in the UP-state.

Further, the duty ratio represents a ratio of the UP-period to the unit period (operation period of position calculation). For example, when the duty ratio of 40%, of one second as the unit period, 400 milliseconds are in the UP-period and the remaining 600 milliseconds are in the SLEEP-period.

The RF receiver circuit unit 20 is controlled so that an ON-state and an OFF-state may be repeated for each predetermined time (e.g., one millisecond) (second intermittent drive control). The ON-state is an operation state in which power is supplied from the power supply unit 50 to the RF receiver circuit unit 20, and circuit operation of amplifying the RF signals received by the GPS antenna 10, down-converting the signals into intermediate frequency signals, cutting unwanted frequency band components, and converting the signals into digital signals (receiving operation) is performed. On the other hand, the OFF-state is an operation state in which power is not supplied from the power supply unit 50 to the RF receiver circuit unit 20 and the circuit operation is not performed.

Here, the predetermined time "one millisecond" of the repetition of the intermittent drive of the RF receiver circuit unit 20 corresponds to carrier wave time (reception time) of the code length of the C/A code as the spread code of the GPS satellite signal. The C/A code is a pseudo random noise code having a repetition period of one millisecond with the code length of 1023 chips as one PN frame, and unique to each GPS satellite.

The duty ratio of intermittent drive with respect to the baseband processing circuit unit 40 is changed in response to reception statuses. For the reception status, a received signal strength is used in the embodiment, and the addition or replacement of another element such as DOP (Dilution Of Precision) value or the like may be adopted. The duty ratio is changed to be smaller as the received signal strength is stronger in the embodiment. FIGS. 3A to 3F show examples of the duty ratio of intermittent drive with respect to the baseband processing circuit unit 40. In FIGS. 3A to 3F, the cases where the duty ratio is 12% (FIG. 3A), 20% (FIG. 3B), 40% (FIG. 3C), 56% (FIG. 3D), 64% (FIG. 3E), 80% (FIG. 3F) are shown sequentially from the top. Hereinafter, a pattern of allocating time for the UP-period and the SLEEP-period in the unit period as shown in the examples of FIGS. 3A to 3F is referred to as "intermittent drive pattern".

In the embodiment, in the case where the duty ratio falls in a predetermined range (e.g., 40% to 60%), in the unit period (one second), a plurality of UP-periods having the same length exist and a total of the plurality of UP-periods is determined to be the length of the UP-period determined by the duty ratio. For example, in FIG. 3D, in the case where the duty ratio is 56%, four UP-periods of "140 milliseconds" exist and a total of the four UP-periods is "560 milliseconds (=1 second×56%)".

Further, in the unit period, the UP-period is disposed temporally symmetrically with respect to the center time of the unit period (symmetry in FIGS. 3A to 3F). For example, in FIGS. 3A to 3F, in the case where the unit period contains one UP-period (the cases where the duty ratio is 12% (FIG. 3A), 20% (FIG. 3B), 80% (FIG. 3F)), the UP-period is disposed so that its midpoint coincides with the center time of the unit period. Further, in the case where the unit period contains a plurality of UP-periods (the cases where the duty ratio is 40% (FIG. 3C), 56% (FIG. 3D), 64% (FIG. 3E), the plurality of UP-periods are disposed so that the time difference between the center time of the nth UP-period before the center time of the unit time and the center time of the unit time and the time difference between the center time of the nth UP-period after the center time of the unit time and the center time of the unit time may be equal (n is an integer equal to or more than one). Thereby, regardless of the duty ratio, even when measurement data 240 in the unit period is integrated and averaged, measurement time as observation time of the measurement data 240 relating to the unit period is the center time of the unit period.

In the GPS receiver 1, the received signals are sampled at predetermined sampling intervals (e.g., 20 milliseconds) that are shorter than the unit period (e.g., one second) and a correlation calculation is performed between the respective sampled data and replica codes, and thereby, correlation values are calculated. Then, an average value of all correlation values in the unit period is used as a correlation calculation result in the unit period, and the measurement data 240 is calculated based on the correlation calculation result. As described above, correlation calculation processing is performed in the UP-period of the baseband processing circuit unit 40, and the correlation calculation processing is not performed in the SLEEP-period. Accordingly, the intermittent drive pattern is formed as shown in FIGS. 3A to 3F, and thereby, the average time of the UP-period contained in the unit period is the center time of the unit period and the center time is the measurement time in the unit period. Therefore, even when the intermittent drive pattern is changed, the intervals of the measurement time may be made constant.

Configuration of Baseband Processing Circuit Unit

Figure 4:
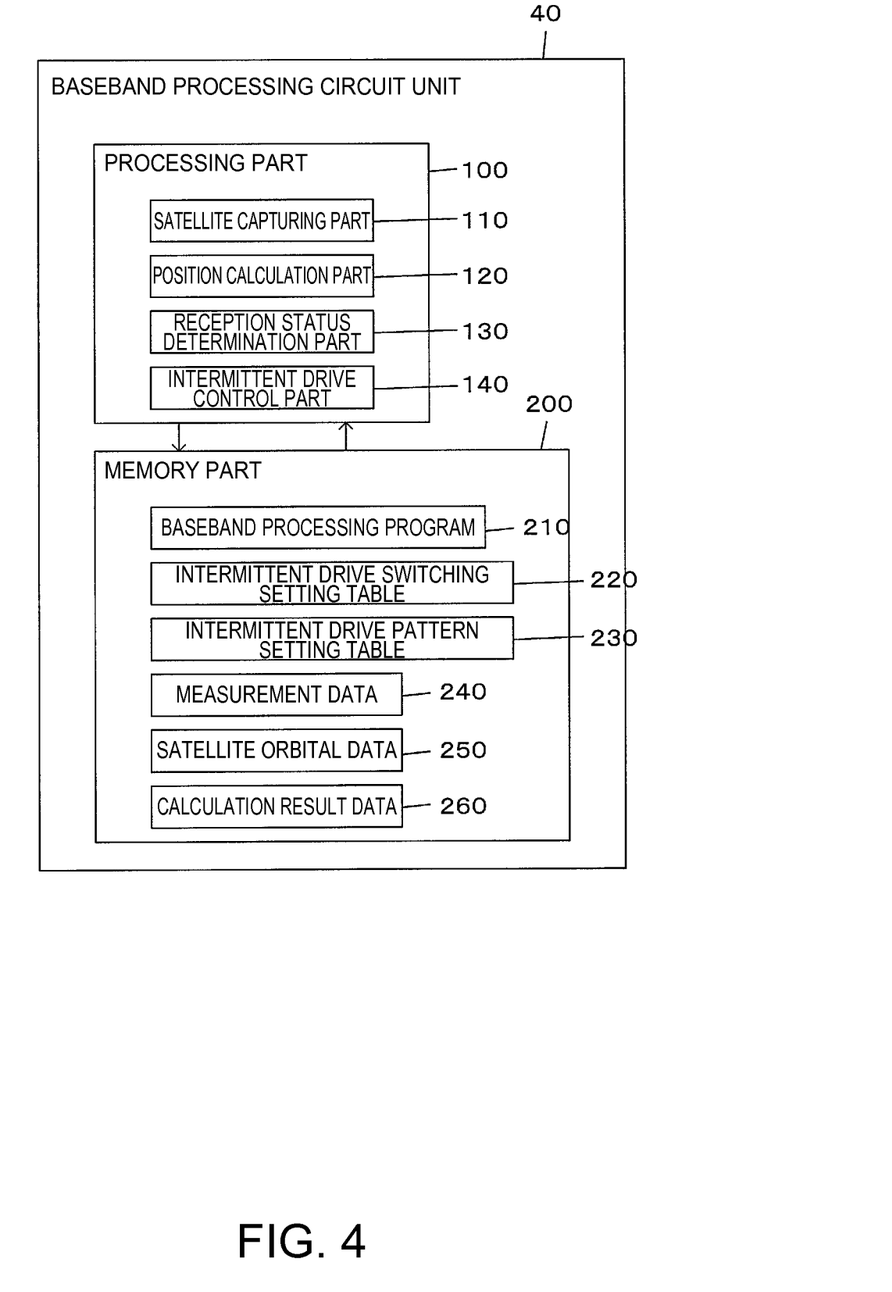
FIG. 4 is a configuration diagram of a baseband processing circuit unit.

FIG. 4 is a function configuration diagram of the baseband processing circuit unit 40. According to FIG. 4, the baseband processing circuit unit 40 has a processing part 100 and a memory part 200.

The processing part 100 is preferably a processor such as a CPU or a DSP, and performs integrated control on the respective parts of the baseband processing circuit unit 40. Further, the processing part 100 has a satellite capturing part 110, a position calculation part 120, a reception status determination part 130, and an intermittent drive control part 140, and performs baseband processing according to a baseband processing program 210 (see FIG. 7).

The satellite capturing part 110 performs digital signal processing including carrier removal and correlation calculations on the data of the received signals stored in the memory unit 30 to capture the GPS satellites (GPS satellite signals). Here, the data of the received signals stored in the memory unit 30 is reception data in the ON-period of the RF receiver circuit unit 20.

The position calculation part 120 acquires satellite orbital data 250 and the measurement data 240 with respect to each of the GPS satellites captured by the satellite capturing part 110, performs position calculation processing using the acquired data, and thereby, calculates the position and the clock error (clock bias) of the GPS receiver 1. As the position calculation processing, for example, a known technique of least squares, Karman filter, or the like may be applied.

The satellite orbital data 250 is data of almanac and ephemeris of each GPS satellite, and is acquired by decoding the received GPS satellite signals. The measurement data 240 is data of code phases and Doppler frequencies relating to the received GPS satellite signals and is acquired based on the results of correlation calculation with the replica codes. Then, the data of the position and the clock error calculated by the position calculation part 120 is accumulated and stored as calculation result data 260.

The reception status determination part 130 determines the reception status of the GPS satellite signals in the GPS receiver 1. In the embodiment, the reception status is determined based on the fifth strongest signal strength of the signal strengths of the GPS satellite signals captured by the satellite capturing part 110. The reception status may be an average value of the respective signal strengths of the captured GPS satellite signals or determined using a DOP (Dilution of Precision) value representing the degree of degradation of the GPS positioning accuracy. The DOP value is determined depending on the position of the GPS satellite, and the smaller the DOP value, the higher the positioning accuracy.

The intermittent drive control part 140 controls intermittent drive of the baseband processing circuit unit 40 and the RF receiver circuit unit 20. Specifically, the drive control part 140 determines whether or not the ephemeris is being received from the captured GPS satellite and, if the ephemeris is being received, the drive control part 140 sets the duty ratio of the intermittent drive in the baseband processing circuit unit 40 to "100%". If the ephemeris is not being received, the drive control part 140 sets the duty ratio of the intermittent drive in the baseband processing circuit unit 40 based on the received signal strength determined by the reception status determination part 130 according to an intermittent drive switching setting table 220 of the memory part 200. Then, the drive control part 140 controls the baseband processing circuit unit 40 to repeat the UP-state and the SLEEP-state in the intermittent drive pattern corresponding to the set duty ratio according to an intermittent drive pattern setting table 230 of the memory part 200.

Figure 5:
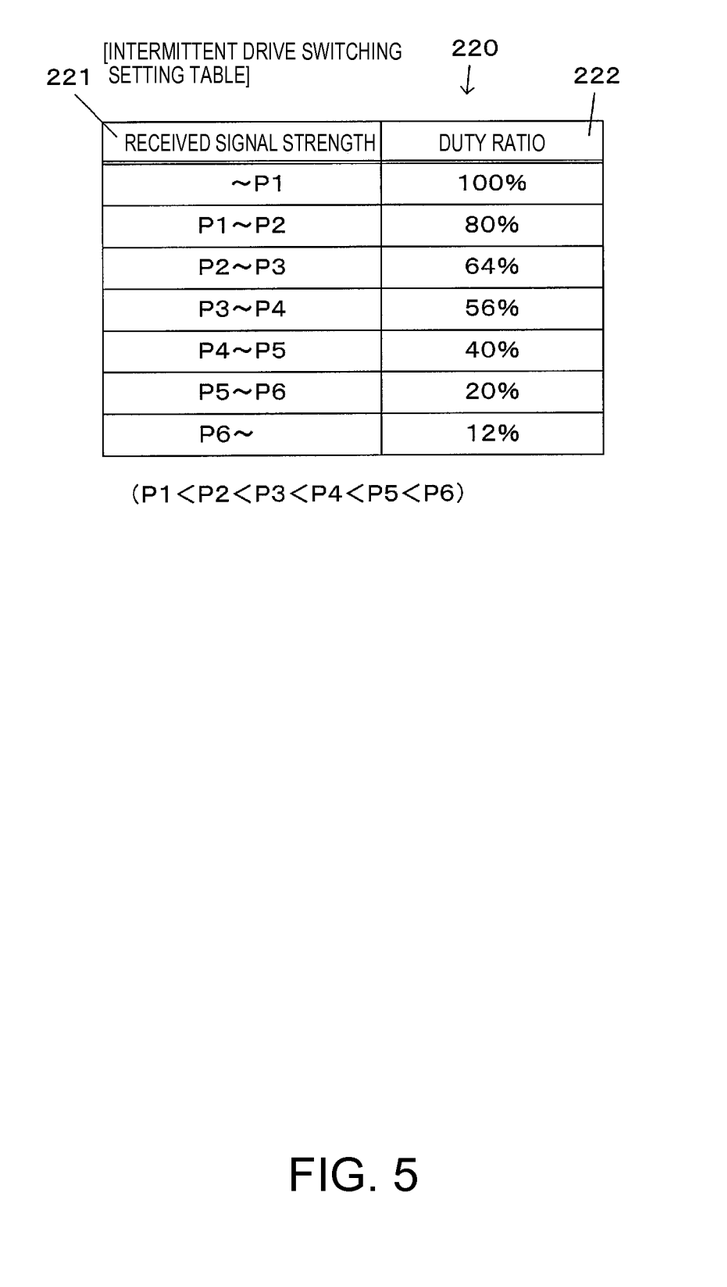
FIG. 5 shows a data configuration example of an intermittent drive switching setting table.

FIG. 5 shows a data configuration example of the intermittent drive switching setting table 220. According to FIG. 5, the intermittent drive switching setting table 220 stores received signal strengths 221 of the GPS satellite signals as the reception statuses and duty ratios 222 in correspondence with each other. The duty ratio 222 is set to be smaller as the received signal strength 221 becomes larger (stronger).

Figure 6:
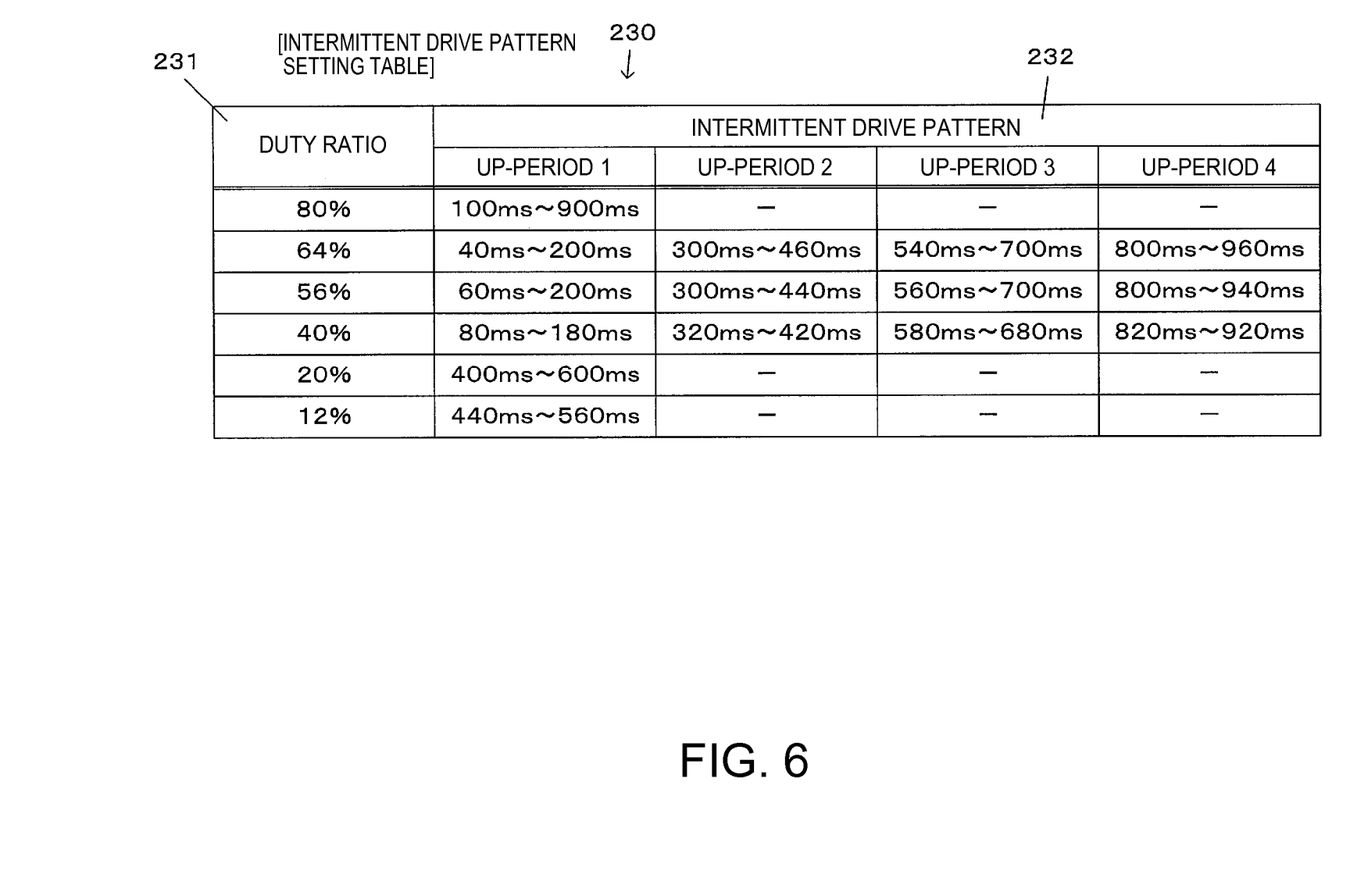
FIG. 6 shows a data configuration example of an intermittent drive pattern setting table.

FIG. 6 shows a data configuration example of the intermittent drive pattern setting table 230. As shown in FIG. 6, the intermittent drive pattern setting table 230 stores start times and end times of the respective UP-periods with reference to the start time of the unit period as intermittent drive patterns 232 in correspondence with the respective duty ratios 222 determined in the intermittent drive switching setting table 220 (duty ratios 231 in FIG. 6).

Returning to FIG. 4, the intermittent drive control part 140 controls the intermittent drive in the RF receiver circuit unit 20. That is, the intermittent drive control part 140 controls the power supply unit 50 to intermittently drive the RF receiver circuit unit 20 to repeat the ON-state and the OFF-state for each predetermined time (one millisecond).

The memory part 200 is preferably a ROM, a RAM, or the like and stores the system program for integrated control of the baseband processing circuit unit 40 by the processing part 100 and programs, data, and the like for realization of various functions and is used as a work area of the processing part 100, and temporarily stores the calculation result of the processing part 100. In the embodiment, the baseband processing program 210, the intermittent drive switching setting table 220, the intermittent drive pattern setting table 230, the measurement data 240, the satellite orbital data 250, and the calculation result data 260 are stored in the memory part 200.

Flow of Processing

Figure 7:
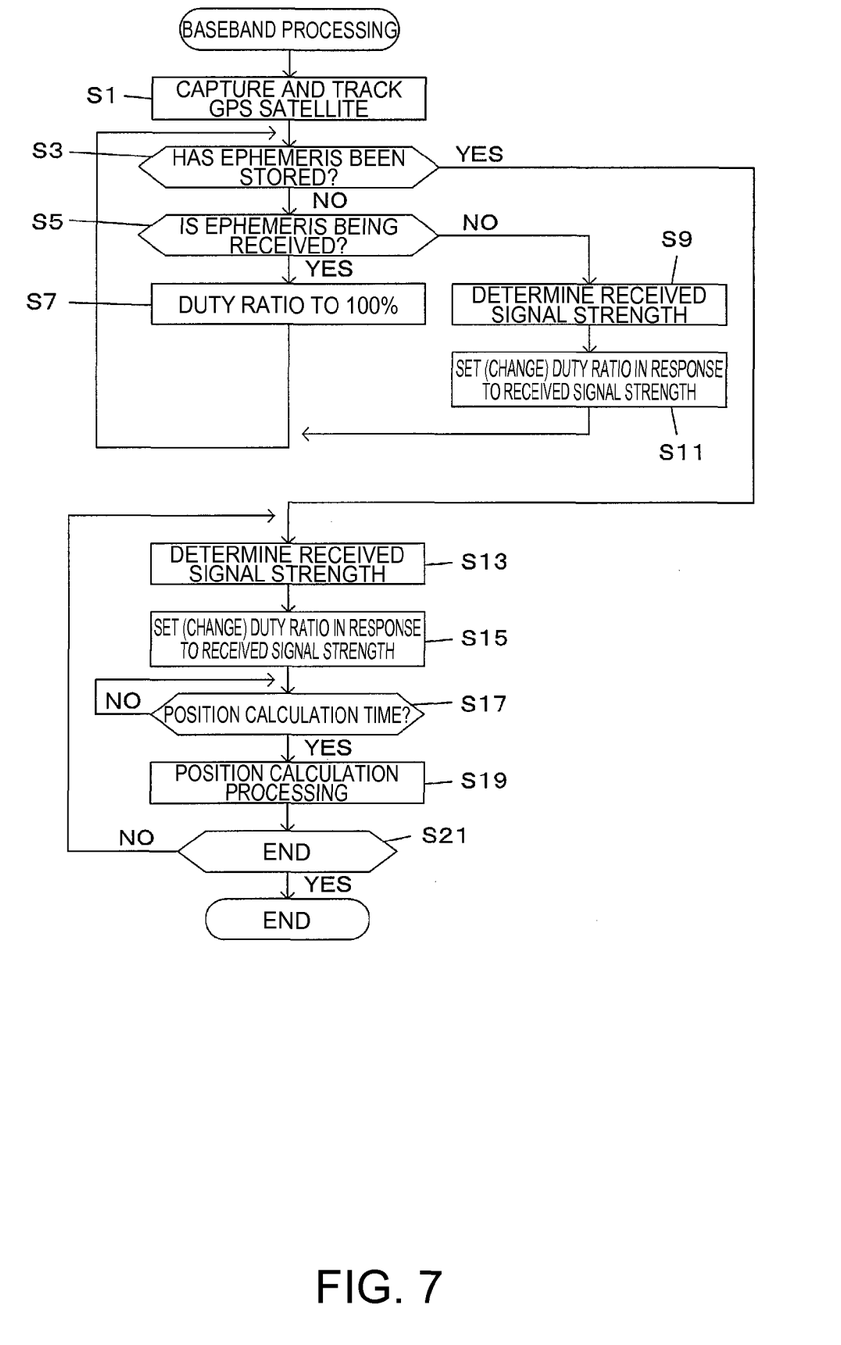
FIG. 7 is a flowchart of baseband processing.

FIG. 7 is a flowchart for explanation of a flow of the baseband processing executed by the processing part 100 according to the baseband processing program 210. As shown in FIG. 7, first, the satellite capturing part 110 selects candidate GPS satellites to be captured with reference to the satellite orbital data 250 or the like, and starts capturing and tracking the GPS satellites (step S1). Then, the intermittent drive control part 140 determines whether or not the ephemeris of each captured satellite has been stored as the satellite orbital data 250 (step S3).

If there is a captured satellite without any stored ephemeris (step S3: NO), then, the intermittent drive control part 140 determines whether or not the ephemeris is being received (step S5). Specifically, the intermittent drive control part 140 determines whether or not the data carried on the GPS signals received from the captured satellite is a data part of the ephemeris not stored in the memory part 200. If the ephemeris is being received (step S5: YES), the intermittent drive control part 140 sets the duty ratio of the intermittent drive of the baseband processing circuit unit 40 to "100%" (step S7). On the other hand, if the ephemeris is not being received (step S5: NO), the reception status determination part 130 determines the reception status of the GPS satellite signals (step S9), and the intermittent drive control part 140 sets the duty ratio of the intermittent drive of the baseband processing circuit unit 40 in response to the determined reception status (step S11). Then, the processing returns to step S3.

On the other hand, if the ephemeris of each captured satellite has been stored (step S3: YES), the reception status determination part 130 determines the reception status of the GPS satellite signals (step S13), and the intermittent drive control part 140 sets the duty ratio of the intermittent drive of the baseband processing circuit unit 40 in response to the determined reception status (step S15).

Then, after waiting for a predetermined position calculation time (step S17: NO), at the position calculation time (step S17: YES), the position calculation part 120 performs position calculation processing and calculates the position and the clock error of the GPS receiver 1 (step S19). Then, the processing part 100 determines whether or not to end the baseband processing and, if the processing is not ended (step S21: NO), returns to step S13 and if the processing is ended (step S21: YES), ends the baseband processing.

As shown in FIG. 7, the time at which the position calculation processing at step S17 is first performed after completion of the acquisition of the ephemerides of the captured satellites is initial positioning (so-called FirstFix). After the initial positioning, control of the duty ratio in response to the reception status (received signal strength) operates.

Experimental Results

Subsequently, experimental results with respect to the GPS receiver 1 in the embodiment will be explained.

(A) Positioning Error

Figure 8:
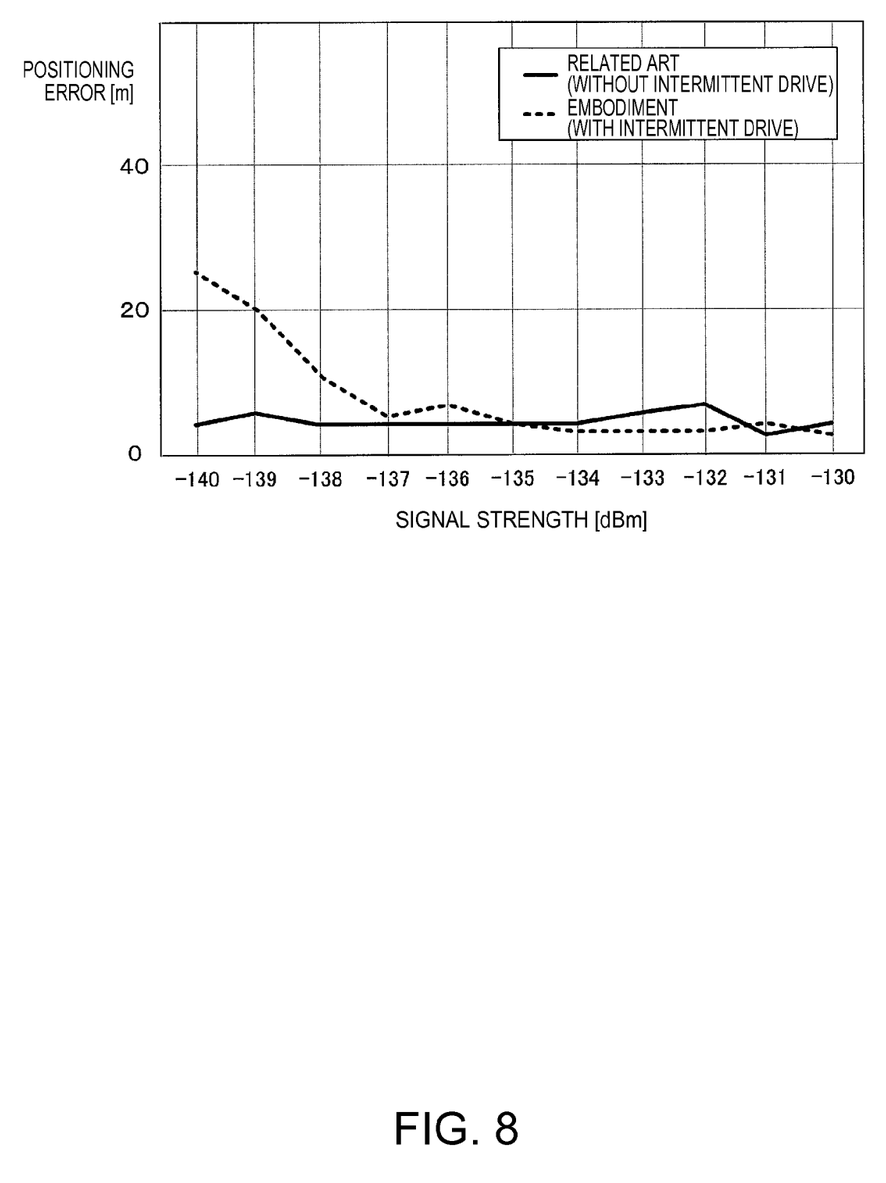
FIG. 8 shows experimental results representing relations between signal strengths and positioning errors.

FIG. 8 is a graph showing relationships between reception environments (signal strengths) of the GPS satellite signals and errors of positioned positions (positions obtained by positioning calculation). In FIG. 8, the horizontal axis indicates signal strengths (the unit is dBm) and the vertical axis indicates the positioning errors (the unit is m indicated by absolute values). The experiment was conducted using a simulator of generating and emitting signals simulating satellite signals. It would be obvious to a person who skilled in the art that the equal results are obtained in the real environment.

The positioning errors as differences between the positioned positions and the actual positions (real position) were calculated with respect to the cases of the intermittent drive of the embodiment and drive control in the related art (i.e., without intermittent drive). Regarding the positioning errors, positioning (position calculation; sampling) was performed at a plurality of times with respect to a different plurality of signal strengths, and the position errors with reliability of "95%" were calculated. The reliability is an index indicating the degree of distribution of the sampled positioning errors, and specifically indicates the degree of deviation of the employed sampling data from the mean value of the sampled positioning errors. 100% indicates employment of all sampling data and 95% indicates employment of 95% of the sampling data sequentially from the mean value (conversely, indicates exclusion of 5% of the most deviated sampling data from the mean value).

According to the experimental results, the intermittent drive of the embodiment is nearly equal to the drive control in the related art in positioning errors with the signal strength equal to or more than "−137 dBm". Further, with the signal strength equal to or more than "−136 dBm", the positioning errors are "equal to or less than 10 m", specifically, "equal to or less than 8 m".

(B) Duty Ratio

Figure 9A:
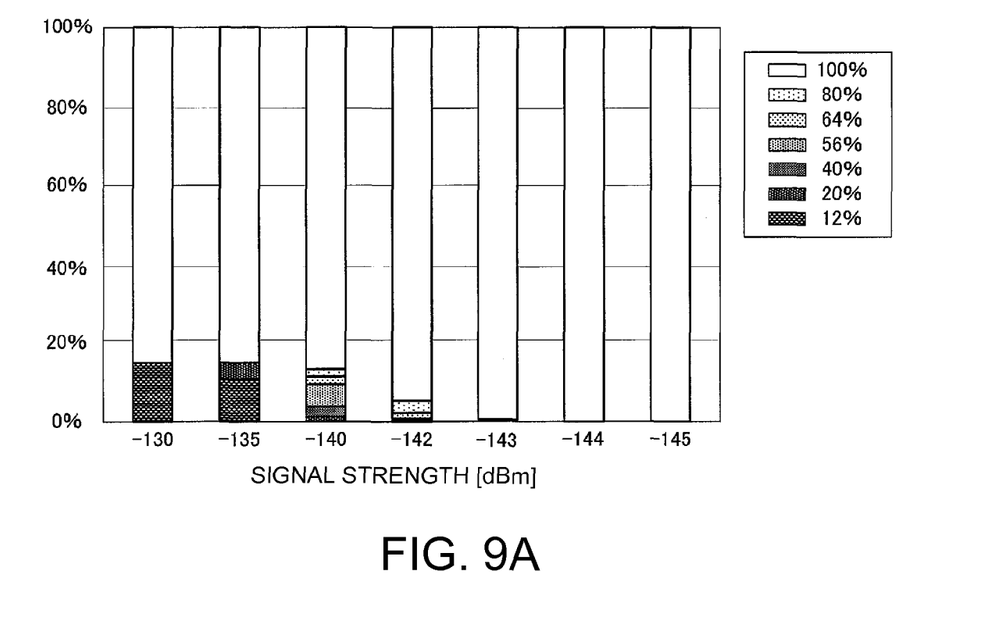
FIGS. 9A and 9B show experimental results representing relations between signal strengths and duty ratios.
Figure 9B:
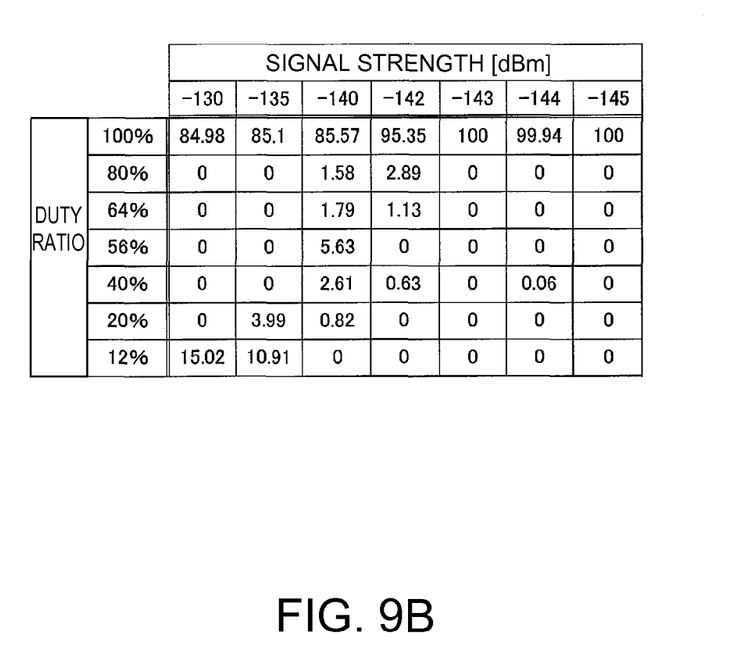

FIGS. 9A and 9B show experimental results with respect to relations between reception environments (signal strengths) of the GPS satellite signals and duty ratios of the intermittent drive of the baseband processing circuit unit 40. FIG. 9A is a band graph showing time ratios (configuration ratios) of the duty ratios with respect to a different plurality of signal strengths (dBm), and FIG. 9B is a table showing the time ratios of the duty ratios with respect to the signal strengths (dBm) in numerical values. The experiment was conducted using a simulator of generating and emitting signals simulating satellite signals. It would be clear to a person who is skilled in the art that equal results are obtained in the real environment.

In the experiment, positioning was performed with respect to the plurality of cases with different signal strengths and the operation times of the respective duty ratios in a period from the start of positioning to the initial positioning were measured. Because of cold starting, the duty ratio was set to "100%" for reception of ephemerides immediately after the start of positioning. Then, when the reception of ephemerides was completed, the duty ratio was set in response to the signal strength. Accordingly, the ratio of the duty ratio of "100%" is higher in any of the signal strengths.

Further, regarding the changes of the duty ratio after completion of the reception of ephemerides, when the signal strength is stronger (larger), equal to or more than "−142 dBm", the ratio of the time of operation at the smaller duty ratio is higher as the signal strength is larger. Further, when the signal strength is weaker (smaller), equal to or less than "−143 dBm", most of the duty ratios are "100%". The baseband processing circuit unit 40 is not intermittently driven even when the ephemeris is not being received.

(C) Power Consumption

Figure 10:
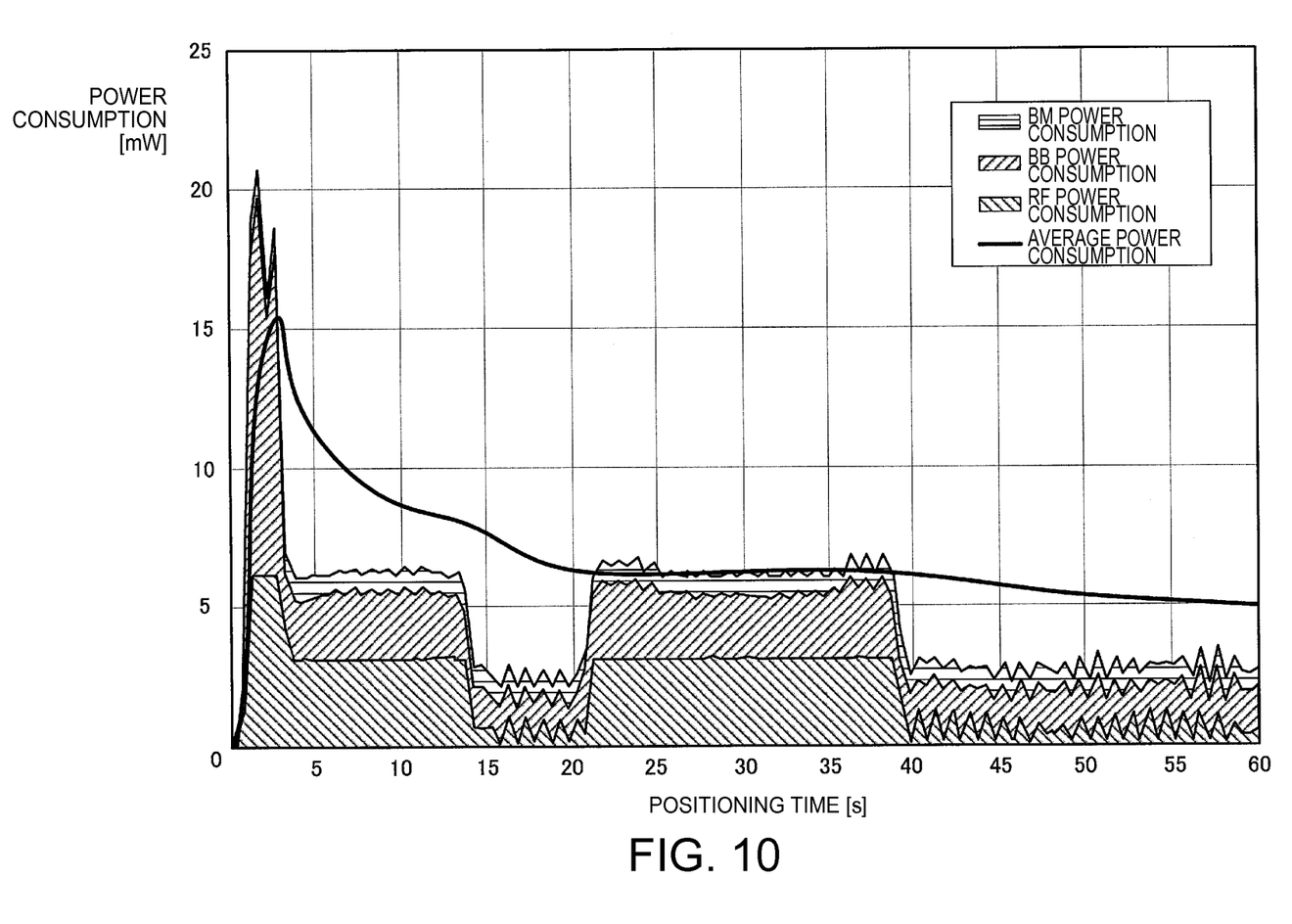
FIG. 10 shows experimental results representing changes of power consumption over time.

FIG. 10 is a graph showing measurement results of power consumption in the GPS receiver 1. In FIG. 10, the horizontal axis indicates positioning times (the unit is seconds) as lapse times from the start of positioning and the vertical axis indicates power consumption (the unit is mW). FIG. 10 shows a cumulative area chart of respective power consumption of the baseband processing circuit unit 40 (BB), the RF receiver circuit unit 20 (RF), and a backup memory and a line chart of average power consumption obtained by time-averaging of total power consumption (averaging of all power consumption to the time). The backup memory (BM, not shown in FIG. 1 etc.) is a volatile memory formed as a part of the memory unit 30 and holds data with power supply from the power supply unit 50.

In the experiment, positioning using intermittent drive of the embodiment was conducted from cold starting in the reception status with the signal strength of "−130 dBm". Note that, with the signal strength of "−130 dBm", as shown in FIGS. 9A and 9B, the duty ratio of the drive control of the baseband processing circuit unit 40 is reduced when the reception of the ephemeris is completed.

According to the experimental results, the power consumption of the backup memory was almost unchanged and the power consumption of the baseband processing circuit unit 40 and the RF receiver circuit unit 20 was changed with respect to the time lapses. That is, in a period from zero (start of positioning) to four seconds of the positioning time, capturing of the GPS satellites was performed and the power consumption was largely increased. Then, in a period from four to 14 seconds and a period from 20 to 39 seconds of the positioning time, ephemerides were received. In the periods, the duty ratio of the intermittent drive of the baseband processing circuit unit 40 was "100%".

Further, in a period from 14 to 20 seconds of the positioning time, the power consumption of the baseband processing circuit unit 40 and the RF receiver circuit unit 20 was largely reduced and, it is known that the ephemerides were not received and the duty ratio was reduced. Then, around the 39th second of the positioning time, initial positioning was conducted. In the period after the initial positioning (after 39 seconds), the duty ratio was reduced and the total power consumption of the backup memory, the baseband processing circuit unit 40, and the RF receiver circuit unit 20 was "equal to or less than 4 mW". In other words, the average power consumption in the period after the initial positioning (e.g., from 40 to 50 seconds or thereabouts) was "equal to or less than 4 mW".

Further, regarding the average power consumption, the average power consumption in the period from the start of positioning (zero seconds) to the initial positioning (39 seconds) was about 6 mW. Furthermore, the average power consumption in the period from the start of positioning (zero seconds) to 60 seconds was about 5 mW.

Advantages

As described above, according to the GPS receiver of the embodiment, a receiver that may exert higher positioning accuracy with lower power consumption than that in the related art may be realized.

Modified Examples

The embodiments to which the invention is applicable are not limited to the above described embodiment, but, obviously, appropriate changes may be made without departing from the scope of the invention. Some modified examples will be explained below. For the explanation of the modified examples, the same configurations as those of the embodiment described above have the same signs and their explanation will be omitted.

(A) Intermittent Drive of RF Receiver Circuit Unit 20

For example, in the above described embodiment, intermittent drive (control of repeating the ON-period and the OFF-period in the period of one millisecond) with respect to the RF receiver circuit unit 20 is constantly performed, however, the control may be performed in the following manner.

(A-1)

Around the rollover of the code phase, for shifting BTT (Bit Transition Time) as the time at which the bit value of the navigation message is changed from the time of intermittent drive, the intermittent drive may be temporarily not performed, but the ON-period may be continued.

(A-2)

Further, in the first predetermined time of the UP-period of the baseband processing circuit unit 40, for capturing of GPS satellite signals, the intermittent drive may be temporarily not performed, but only the ON-period may be provided.

(A-3)

The intermittent drive may be executed in response to the reception status (received signal strength). Specifically, the intermittent drive may be executed when the reception status is good (i.e., when the signal strength is larger than a predetermined strength) and not executed when the reception status is bad (i.e., when the signal strength is smaller than the predetermined strength).

(A-4)

Further, the intermittent drive may be executed in response to the detection status of BTT. Specifically, whether or not the BTT has been detected is determined, and the intermittent drive is executed if the BTT has been detected and not executed if the BTT has not been detected. Or, the intermittent drive may be executed if the BTT has been detected and the signal strength is larger than a predetermined strength.

(B) Execution of Intermittent Drive

The intermittent drive with respect to the baseband processing circuit unit 40 and the RF receiver circuit unit 20 may not be performed until the first positioning, but may be performed after the first positioning.

(C) Intermittent Drive Pattern

In the above described embodiment, when the duty ratio falls in a predetermined range, a plurality of the UP-periods are contained within the unit period, however, one UP-period may be contained in the unit period. For example, when the duty ratio is 40%, a continuous UP-period of 400 ms may be provided.

(D) Main Actor of Processing

In the above described embodiment, the explanation is made with the position calculation processing executed by the processing part 100 (position processing part 120) of the baseband processing circuit unit 40, however, the processing may be executed by the main processing unit 60.

(E) Other Sensors

In addition to the configuration of the above described embodiment, the electronic apparatus may include various types of sensors. In combination with the positioning calculation of GPS, even lower power consumption or even higher positioning accuracy may be achieved. As the sensors, an acceleration sensor, a gyro sensor, a direction sensor, and the like may be exemplified.

(F) Electronic Apparatuses

In the above described embodiment, the case where the invention is applied to a runner's watch as a type of electronic apparatus is explained as an example, however, the electronic apparatuses to which the invention is applicable are not limited to that. For example, the invention may be similarly applied to other electronic apparatuses including a car navigation system, a portable navigation system, a personal computer, a PDA (Personal Digital Assistant), a cell phone, and a wristwatch.

(G) Satellite Positioning System

In the above described embodiment, a GPS is explained as an example of the satellite positioning system, however, other satellite systems including WAAS (Wide Area Augmentation System), QZSS (Quasi Zenith Satellite System), GLONASS (GLObal Navigation Satellite System), GALILEO, and BeiDou (BeiDou Navigation Satellite System) may be employed.

What is claimed is:

1. A satellite signal receiver having a positioning error in a range from −8 m to +8 m with a probability equal to or more than 95% when positioning in a reception environment with a signal strength equal to or more than −135 dBm and average power consumption from start of positioning to first positioning equal to or less than 7 mW.

2. A satellite signal receiver having a positioning error in a range from −8 m to +8 m with a probability equal to or more than 95% when positioning in a reception environment with a signal strength equal to or more than −135 dBm and average power consumption from the start of positioning to 60 seconds is equal to or less than 6 mW.

3. A satellite signal receiver having a positioning error in a range from −8 m to +8 m with a probability equal to or more than 95% when positioning in a reception environment with a signal strength equal to or more than −135 dBm and average power consumption from the start of positioning to after the first positioning is equal to or less than 5 mW.

4. The satellite signal receiver according to claim 3, wherein the average power consumption after the first positioning is equal to or less than 4 mW.

* * * * *